US012801369B2

(12) United States Patent
Takahashi et al.

(10) Patent No.: US 12,801,369 B2
(45) Date of Patent: Nov. 17, 2026

(54) DISTRIBUTING UPDATE DATA OF SOFTWARE FOR IN-VEHICLE DEVICES TO A VEHICLE

(71) Applicant: TOYOTA JIDOSHA KABUSHIKI KAISHA, Toyota (JP)

(72) Inventors: Shuhei Takahashi, Kariya-city (JP); Yuzo Harata, Kariya-city (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 276 days.

(21) Appl. No.: 18/591,773

(22) Filed: Feb. 29, 2024

(65) Prior Publication Data

US 2024/0311132 A1 Sep. 19, 2024

(30) Foreign Application Priority Data

Mar. 15, 2023 (JP) ............................. JP2023-040825

(51) Int. Cl.
*G06F 8/65* (2018.01)

(52) U.S. Cl.
CPC ...................................... *G06F 8/65* (2013.01)

(58) Field of Classification Search
None
See application file for complete search history.

(56) References Cited

U.S. PATENT DOCUMENTS

2015/0113520 A1* 4/2015 Kotani ...................... G06F 8/65 717/172
2015/0301822 A1* 10/2015 Takahashi ............ B60R 16/023 717/173
2018/0095745 A1* 4/2018 Mine .................. G06F 11/3698
2018/0205602 A1* 7/2018 Roman .................. H04L 67/12
2019/0265966 A1 8/2019 Shimomura
2020/0050442 A1* 2/2020 Sakurai .................. H04W 4/48
2022/0024472 A1* 1/2022 Hachisuwa ............... G06F 8/65
2022/0317992 A1* 10/2022 Inoue ........................ G06F 8/65
2022/0317994 A1* 10/2022 Nagamitsu .......... B60R 16/0231
2023/0315440 A1* 10/2023 Clark ................. G06F 11/0751

FOREIGN PATENT DOCUMENTS

JP 2004-326689 A 11/2004
JP 2018-072920 A 5/2018

* cited by examiner

*Primary Examiner* — Qing Chen
(74) *Attorney, Agent, or Firm* — Oliff PLC

(57) ABSTRACT

A distribution system includes a vehicle that includes an in-vehicle network configured by in-vehicle devices, and a distribution server that distributes update data of software for the in-vehicle devices to the vehicle. Updating the software with the update data is performed on a condition that a configuration of the in-vehicle network is normal. The distribution server includes a processor and a storage unit that stores normal configuration information that indicates a normal configuration of the in-vehicle network. The vehicle transmits configuration information on the in-vehicle network to the distribution server. The processor notifies, when the configuration of the in-vehicle network is determined not to be normal, a user of the vehicle that the configuration of the in-vehicle network is not normal.

5 Claims, 4 Drawing Sheets

DISTRIBUTING UPDATE DATA OF SOFTWARE FOR IN-VEHICLE DEVICES TO A VEHICLE

CROSS-REFERENCE TO RELATED APPLICATION

This application claims priority to Japanese Patent Application No. 2023-040825 filed on Mar. 15, 2023 incorporated herein by reference in its entirety.

BACKGROUND

1. Technical Field

The present disclosure relates to a distribution system, a distribution server, and a storage medium.

2. Description of Related Art

Japanese Unexamined Patent Application Publication No. 2004-326689 (JP 2004-326689 A) describes technology that updates software of an in-vehicle device that constitutes an in-vehicle network, by distributing update data to a vehicle via wireless communication.

A software update may not be applied due to an abnormality in the configuration of the in-vehicle network. The software update may continue to remain unapplied without the configuration abnormality of the in-vehicle network being resolved.

SUMMARY

According to one aspect of the present disclosure, a distribution system includes a vehicle that includes an in-vehicle network configured by in-vehicle devices, and a distribution server configured to distribute update data of software for the in-vehicle devices to the vehicle. Updating the program with the update data is performed on a condition that a configuration of the in-vehicle network is normal. The distribution server includes a processor and a storage unit that stores normal configuration information that indicates a normal configuration of the in-vehicle network. The vehicle is configured to transmit configuration information on the in-vehicle network to the distribution server. The processor is configured to determine whether the configuration of the in-vehicle network is normal based on the configuration information and the normal configuration information. The processor is configured to notify, when the configuration of the in-vehicle network is determined not to be normal, a user of the vehicle that the configuration of the in-vehicle network is not normal.

According to another aspect of the present disclosure, a distribution server is configured to distribute update data of software for in-vehicle devices in a vehicle that includes an in-vehicle network configured by the in-vehicle devices to the vehicle. The distribution server includes a processor and a storage unit that stores normal configuration information that indicates a normal configuration of the in-vehicle network. Updating the software with the update data is performed on a condition that a configuration of the in-vehicle network is normal. The processor is configured to determine whether the configuration of the in-vehicle network is normal, based on the configuration information on the in-vehicle network that is acquired from the vehicle and the normal configuration information. The processor is configured to notify, when the configuration of the in-vehicle network is determined not to be normal, a user of the vehicle that the configuration of the in-vehicle network is not normal.

According to still another aspect of the present disclosure, a non-transitory recording medium stores instructions. The instructions are executable by one or more processors of a distribution server that distributes update data of software for in-vehicle devices in a vehicle that includes an in-vehicle network configured by the in-vehicle devices to the vehicle, and cause the one or more processors to perform functions. Updating the software with the update data is performed on a condition that a configuration of the in-vehicle network is normal. The distribution server includes a storage unit that stores normal configuration information that indicates a normal configuration of the in-vehicle network. The functions include determining whether the configuration of the in-vehicle network is normal, based on the configuration information on the in-vehicle network that is acquired from the vehicle and the normal configuration information. The functions include notifying, when the configuration of the in-vehicle network is determined not to be normal, a user of the vehicle that the configuration of the in-vehicle network is not normal.

Still another aspect of the present disclosure is a method of providing vehicle information to a user of a vehicle. The vehicle includes an in-vehicle network that is configured by in-vehicle devices, and is configured to update a program of the in-vehicle devices based on update data that is distributed by a distribution server outside the vehicle. Updating the program with the update data is performed on a condition that a configuration of the in-vehicle network is normal. The method includes storing normal configuration information that indicates a normal configuration of the in-vehicle network by the distribution server, acquiring configuration information on the in-vehicle network from the vehicle by the distribution server, determining whether the configuration of the in-vehicle network is normal, based on the normal configuration information and the configuration information, and notifying, when the configuration of the in-vehicle network is determined not to be normal, the user that the configuration of the in-vehicle network is not normal by the distribution server.

The user of the vehicle can easily understand that the software update of the in-vehicle device cannot be performed due to a configuration abnormality of the in-vehicle network.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
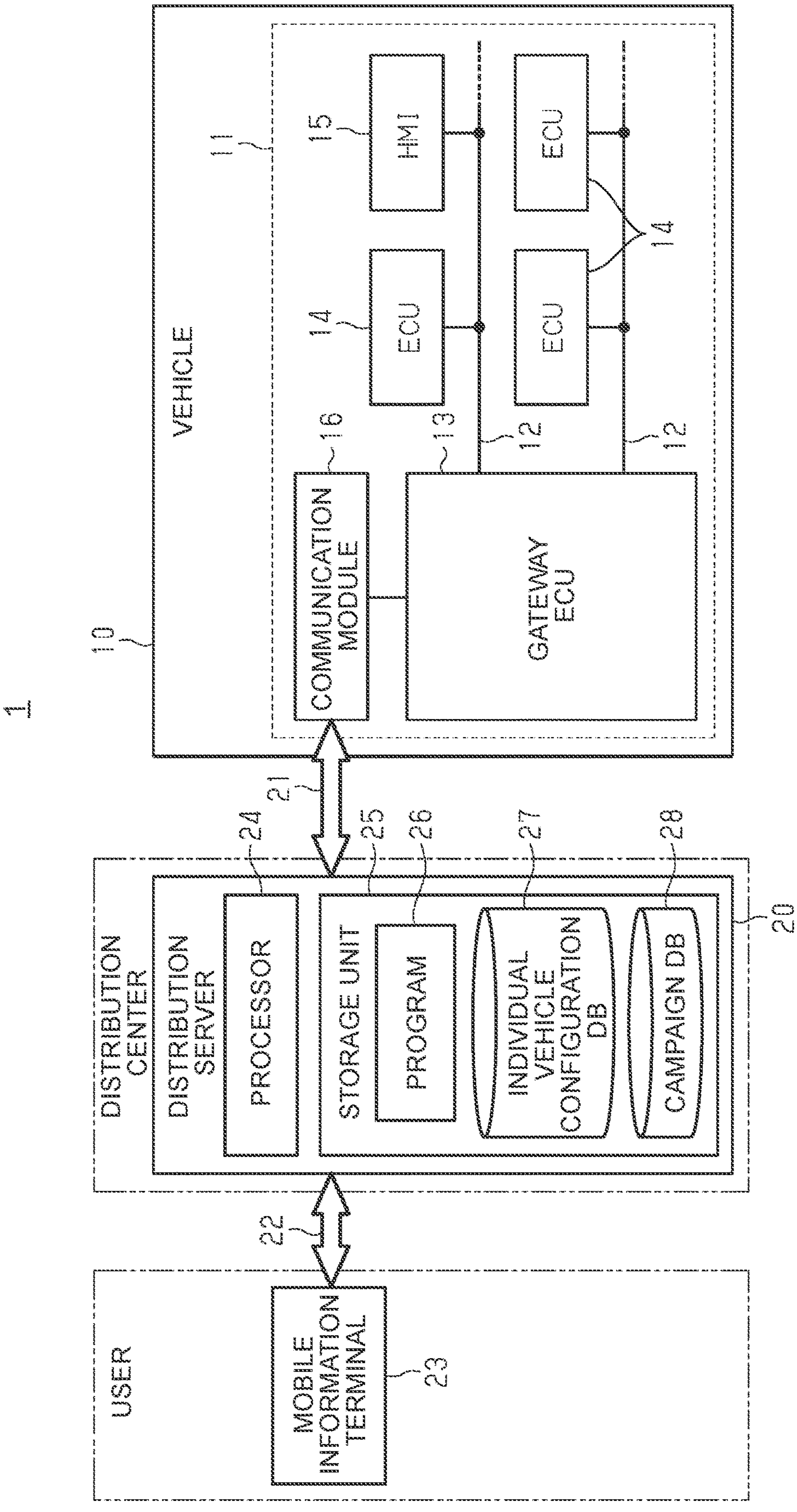
FIG. 1 is a diagram schematically showing a configuration of a distribution system according to a first embodiment.

Hereinafter, a first embodiment of a distribution system, a distribution server, a distribution server program, and a vehicle information providing method will be described in detail with reference to FIGS. 1 to 3.

Distribution System Configuration

First, a configuration of a distribution system 1 according to the present embodiment will be described with reference to FIG. 1. The distribution system 1 according to the present embodiment is configured by a distribution server 20 that is installed at a distribution center, each vehicle 10 under the management of the distribution center, and a mobile information terminal 23 of a user of each vehicle 10.

The vehicle 10 includes an in-vehicle network 11. The in-vehicle network 11 is configured by a plurality of in-vehicle devices that is connected to a communication line 12. The in-vehicle device that constitutes the in-vehicle network 11 is an in-vehicle electronic device that includes a communication function. Each in-vehicle device has a processor and a memory. Also, each in-vehicle device is configured to operate when a processor executes a program stored in the memory.

The vehicle 10 includes a gateway ECU 13 as one of the in-vehicle devices that constitute the in-vehicle network 11. The gateway ECU 13 is an electronic control unit (ECU) that relays communication between the in-vehicle devices via the communication line 12 and between the in-vehicle device and the outside of the vehicle. A communication module 16 is connected to the gateway ECU 13, such that the in-vehicle network 11 is connected to a mobile communication network 21. Note that in FIGS. 2 to 4, the gateway ECU 13 is referred to as "GW-ECU".

The in-vehicle devices that constitute the in-vehicle network 11 include ECUs 14 other than the gateway ECU 13 and an HMI 15. Examples of other ECUs 14 include an ECU for engine control, an ECU for shift control, an ECU for brake control, and an ECU for advanced driver assistance systems. The HMI 15 is a human machine interface. The HMI 15 includes an input device such as a touch panel, and an output device that outputs images and sounds. Other examples of the in-vehicle devices that constitute the in-vehicle network 11 include an in-vehicle entertainment system and a sensor. Such a vehicle 10 is configured to be able to update software of the in-vehicle devices.

The distribution server 20 is a server device that distributes software update data for the in-vehicle device to each vehicle 10 via the mobile communication network 21. The distribution server 20 includes a processor 24 and a storage unit 25. The storage unit 25 is configured by a data storage such as a hard disk drive. The storage unit 25 stores a program 26 that is executed by the processor 24, an individual vehicle configuration database 27, and a campaign database 28. The distribution server 20 is configured to perform each process described below when the processor 24 reads and executes the program 26 stored in the storage unit 25. Also, the distribution server 20 is configured to be able to communicate with the vehicle 10 via the mobile communication network 21. Further, the distribution server 20 is configured to be able to communicate with the mobile information terminal 23 of the user of the vehicle 10 via a wide area information communication network 22 such as a web.

Acquisition of Configuration Information

The distribution server 20 acquires configuration information on the in-vehicle network 11 from each vehicle 10. Then, the distribution server 20 registers the configuration information acquired from each vehicle 10 in the individual vehicle configuration database 27. The configuration information includes model information on each in-vehicle device that constitutes the in-vehicle network 11 and version information on software.

Figure 2:
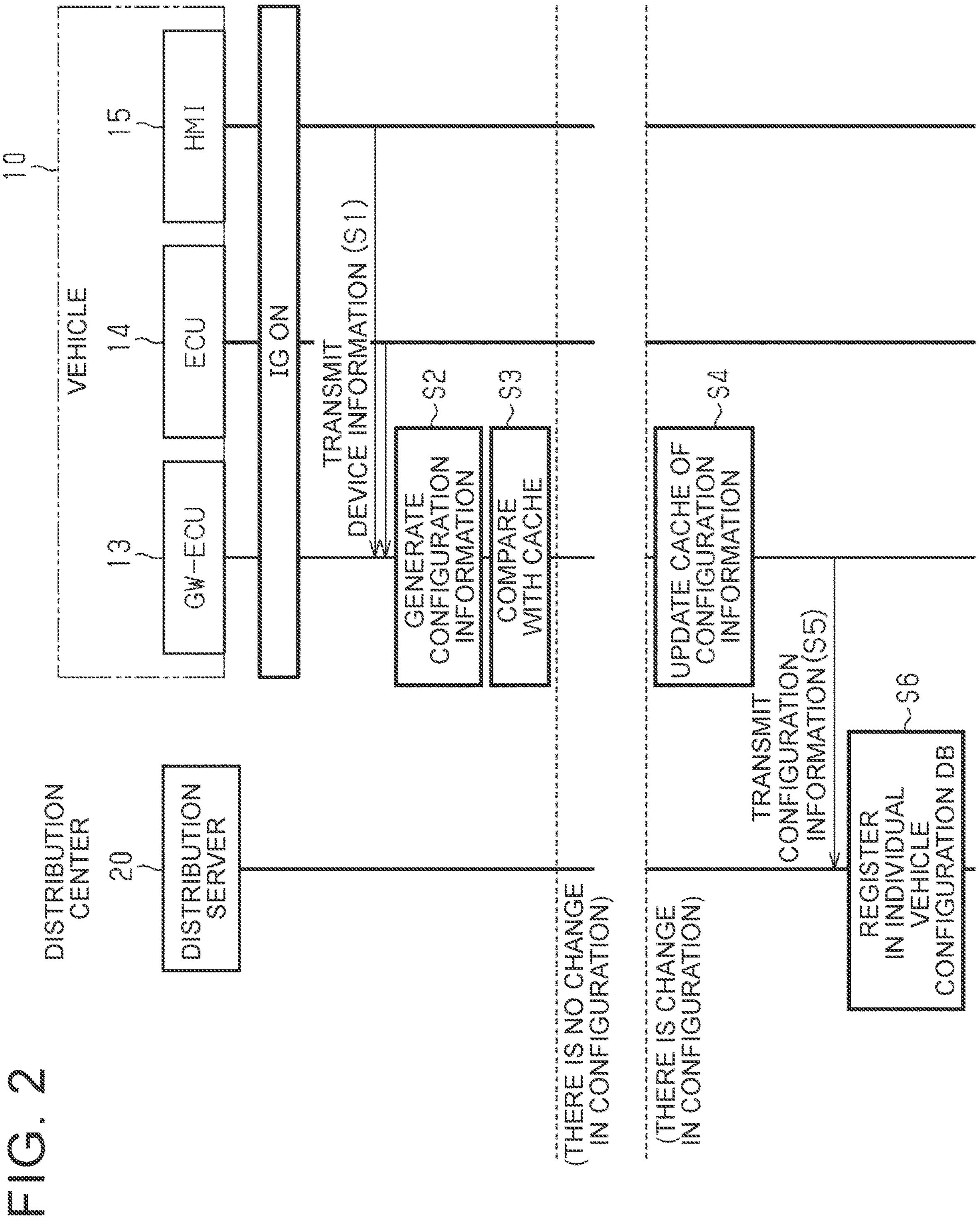
FIG. 2 is a sequence diagram showing a flow of an acquisition process of configuration information in the distribution system.

FIG. 2 shows a process procedure of the distribution system 1 for acquiring and registering the configuration information. In the vehicle 10, each in-vehicle device is activated in response to an ON operation of an ignition switch. In the following description, the ON operation of the ignition switch will be referred to as IG ON.

After IG ON, each in-vehicle device transmits its own device information to the gateway ECU 13 (S1). The device information includes model information on the in-vehicle device and the version information on the software. The gateway ECU 13 generates the configuration information on the in-vehicle network 11 based on the received device information (S2). The configuration information generated by the gateway ECU 13 includes its own device information and the version information on the software.

The gateway ECU 13 stores the previously generated configuration information as a cache. After generating the configuration information, the gateway ECU 13 determines whether there has been a change in the configuration of the in-vehicle network 11 by comparing the cache with the currently generated configuration information (S3). Specifically, the gateway ECU 13 determines that there is no change in the configuration when the currently generated configuration information and the cache match, and determines that there is a change in the configuration when the currently generated configuration information and the cache do not match. Note that there may be cases where the cache of the configuration information is not left in the gateway ECU 13, such as at the IG ON for the first time after manufacturing. In such a case, the gateway ECU 13 determines that there is a change in the configuration of the in-vehicle network 11.

When the gateway ECU 13 determines that there is no change in the configuration of the in-vehicle network 11, the gateway ECU 13 directly ends an update process of the configuration information in the present state of the IG ON. On the other hand, when the gateway ECU 13 determines that there is a change in the configuration of the in-vehicle network 11, the gateway ECU 13 updates the cache of the configuration information (S4). Then, the gateway ECU 13 transmits the configuration information to the distribution server 20 (S5). When the distribution server 20 receives the configuration information, the distribution server 20 updates the configuration information on the corresponding vehicle 10 in the individual vehicle configuration database 27 (S6). As a result, in the individual vehicle configuration database 27, information on the current in-vehicle network 11 of each vehicle 10 is registered.

Distribution of Update Data

Next, a distribution of the software update data for the in-vehicle device via wireless communication will be described with reference to FIG. 3. FIG. 3 shows a process procedure of the distribution system 1 for distributing the update data.

When distributing the update data, an administrator creates campaign information and registers the campaign information in the campaign database 28 (S10). The campaign information includes information such as the software update data, a model and a category of the vehicle 10 that is subject to be updated, a distribution start date of the update data, and a guide text of an update content. Also, the campaign information includes normal configuration information. The normal configuration information is information that indicates the configuration of the in-vehicle network 11 to which the update software can be applied. In the following description, when the configuration of the in-vehicle network 11 is a configuration to which the update software can be applied, the configuration of the in-vehicle network 11 is said to be normal. Also, when the configuration of the in-vehicle network 11 is a configuration to which the update software cannot be applied, the configuration of the in-vehicle network 11 is said to be abnormal. Then, the determination on whether the configuration of the in-vehicle network 11 is normal or abnormal is referred to as a configuration abnormality determination. An example of a case where the configuration of the in-vehicle network 11 becomes abnormal is a case where the user installs an in-vehicle device that is not certified by a manufacturer on the in-vehicle network 11.

When the campaign information on the software update is registered in the campaign database 28, the distribution server 20 performs the configuration abnormality determination for each vehicle 10 that is subject to be updated (S11). Specifically, the distribution server 20 reads the configuration information on each vehicle 10 from the individual vehicle configuration database 27, compares the configuration information with the normal configuration information, and performs the configuration abnormality determination.

The distribution server 20 transmits, based on the campaign information, software update guide to the vehicle 10 that is determined that the configuration is normal (S12). When the gateway ECU 13 of the vehicle 10 receives the update guide, the gateway ECU 13 instructs the HMI 15 to display an update acceptance screen (S13). As a result, a software update acceptance screen is displayed on the HMI 15 (S14). The acceptance screen is a screen for the user to select whether to perform the software update. The HMI 15 notifies a selection result of the user on the acceptance screen to the gateway ECU 13 (S15). FIG. 3 shows a process procedure when the user selects to perform the software update, that is, when the user accepts the software update. When the gateway ECU 13 receives a software update acceptance notification from the HMI 15, the gateway ECU 13 requests the distribution server 20 to transmit the update data (S16). In response to this request, the distribution server 20 transmits the update data to the vehicle 10 (S17). Then, in the vehicle 10, the software update of the in-vehicle device is performed based on the received update data.

On the other hand, the distribution server 20 sends a configuration abnormality notification to the vehicle 10 that is determined that the configuration is abnormal and the mobile information terminal 23 of its user to notify that the configuration of the in-vehicle network 11 is not normal (S18). In response to this notification, in the vehicle 10, the gateway ECU 13 instructs to display the screen (S19), and a configuration abnormality notification screen is displayed on the HMI 15 (S20). In response to the notification of the configuration abnormality, the configuration abnormality notification screen is also displayed on the mobile information terminal 23 (S21). These configuration abnormality notification screens include messages that indicate how to resolve the configuration abnormality. An example of such a message is a message that guides the user to bring the vehicle 10 to a dealer.

Actions and Effects of Embodiments

The distribution system 1 of the present embodiment includes a vehicle 10 that includes an in-vehicle network 11 that is configured by a plurality of in-vehicle devices, and a distribution server 20 that distributes software update data for the in-vehicle devices to the vehicle 10. The distribution system 1 is configured to perform the update of the software using the update data on the condition that a configuration of the in-vehicle network 11 is normal. The distribution server 20 includes a processor 24 and a storage unit 25 that stores normal configuration information that is information that indicates a normal configuration of the in-vehicle network 11. The vehicle 10 is configured to transmit the configuration information on the in-vehicle network 11 to the distribution server 20. The processor 24 of the distribution server 20 performs a process to determine whether the configuration of the in-vehicle network 11 is normal, based on the configuration information and the normal configuration information. Then, when the processor 24 determines that the configuration of the in-vehicle network 11 is not normal, the processor 24 performs a process to notify a user of the vehicle 10 that the configuration of the in-vehicle network 11 is not normal.

Note that the distribution server 20 performs the process when the processor 24 reads and executes the program 26 stored in the storage unit 25 as described above. Therefore, the program 26 is configured to cause the processor 24 to execute following processes (A) and (B). The process (A) is a process that determines whether the configuration of the in-vehicle network 11 is normal, based on the configuration information on the in-vehicle network 11 that is acquired from the vehicle 10 and the normal configuration information. The process (B) is a process that notifies, when the configuration of the in-vehicle network 11 is determined not to be normal, a user of the vehicle 10 that the configuration of the in-vehicle network 11 is not normal.

Furthermore, in the present embodiment, vehicle information is provided to the user of the vehicle 10 through following first to fourth steps. The first step is a step for storing the normal configuration information that indicates the normal configuration of the in-vehicle network 11. The second step is a step for acquiring the configuration information on the in-vehicle network 11 from the vehicle 10. The third step is a step for determining whether the configuration of the in-vehicle network 11 is normal, based on the normal configuration information and the configuration information. The fourth step is a step that notifies, when the configuration of the in-vehicle network 11 is determined not to be normal, the user that the configuration of the in-vehicle network 11 is not normal.

Updating the software of the in-vehicle device is performed on the condition that the configuration of the in-vehicle network 11 is normal. Therefore, when there is the abnormality in the configuration of the in-vehicle network 11, the software update of the in-vehicle device will not be performed. Unless the user recognizes that the software update of the in-vehicle device cannot be performed due to the configuration abnormality of the in-vehicle network 11, the software of the in-vehicle device will continue to not be updated.

In the case of the present embodiment, the distribution server 20 performs the configuration abnormality determination of each vehicle 10. Then, the distribution server 20 notifies the user of the vehicle 10 determined to have the configuration abnormality that the configuration of the in-vehicle network 11 is not normal. Therefore, the present embodiment has an effect of making the user of the vehicle 10 easier to understand that the software update of the in-vehicle device cannot be performed due to the configuration abnormality of the in-vehicle network 11.

According to the present embodiment described above, the following effects can be further achieved.

(1) The configuration abnormality determination requires a large amount of information, and this information is updated from time to time. Therefore, in the vehicle 10, it is difficult to properly perform the configuration abnormality determination. In contrast, in the distribution system 1 of the present embodiment, the storage unit 25 of the distribution server 20 stores the normal configuration information. Then, the distribution server 20 performs the configuration abnormality determination by comparing the normal configuration information with the configuration information that is acquired from the vehicle 10. Therefore, it is possible to appropriately perform the configuration abnormality determination of the in-vehicle network 11.

(2) In the distribution system 1 of the present embodiment, the vehicle 10 transmits the configuration information to the distribution server 20 when there is a change in the configuration of the in-vehicle network 11. Therefore, a discrepancy between the configuration information that is registered in the individual vehicle configuration database 27 and the actual configuration of the in-vehicle network 11 is unlikely to occur.

(3) In the distribution system 1 of the present embodiment, the configuration information on the in-vehicle network 11 includes the version information on the software of the in-vehicle device. Therefore, not only an abnormality in a hardware configuration of the in-vehicle network 11 but also an abnormality in the software configuration can be determined.

(4) In the distribution system 1 of the present embodiment, the distribution server 20 prohibits the transmission of the update data to the vehicle 10 in which the configuration of the in-vehicle network 11 is determined not to be normal. Therefore, the update data is not transmitted unnecessarily to the vehicle 10 to which the update cannot be applied.

(5) In the distribution system 1 of the present embodiment, the distribution server 20 notifies the mobile information terminal 23 of the user that the configuration of the in-vehicle network 11 is not normal. Therefore, the user can receive the notification of the configuration abnormality without getting into the vehicle 10.

(6) In the distribution system 1 of the present embodiment, the distribution server 20 includes a message that guides the user to bring the vehicle 10 to the dealer in the configuration abnormality notification. That is, the distribution server 20 notifies the method for resolving the configuration abnormality to the user. Therefore, it becomes easier to resolve the configuration abnormality.

Second Embodiment

Hereinafter, a second embodiment of the distribution system, the distribution server, the distribution server program, and the vehicle information providing method will be described in detail with reference to FIGS. 1 to 4. In the present embodiment, the configuration information is acquired by performing a processing procedure different from that in the first embodiment. In the present embodiment, configurations that are common to the above embodiment are designated by the same reference signs, and detailed explanation thereof will be omitted.

Figure 3:
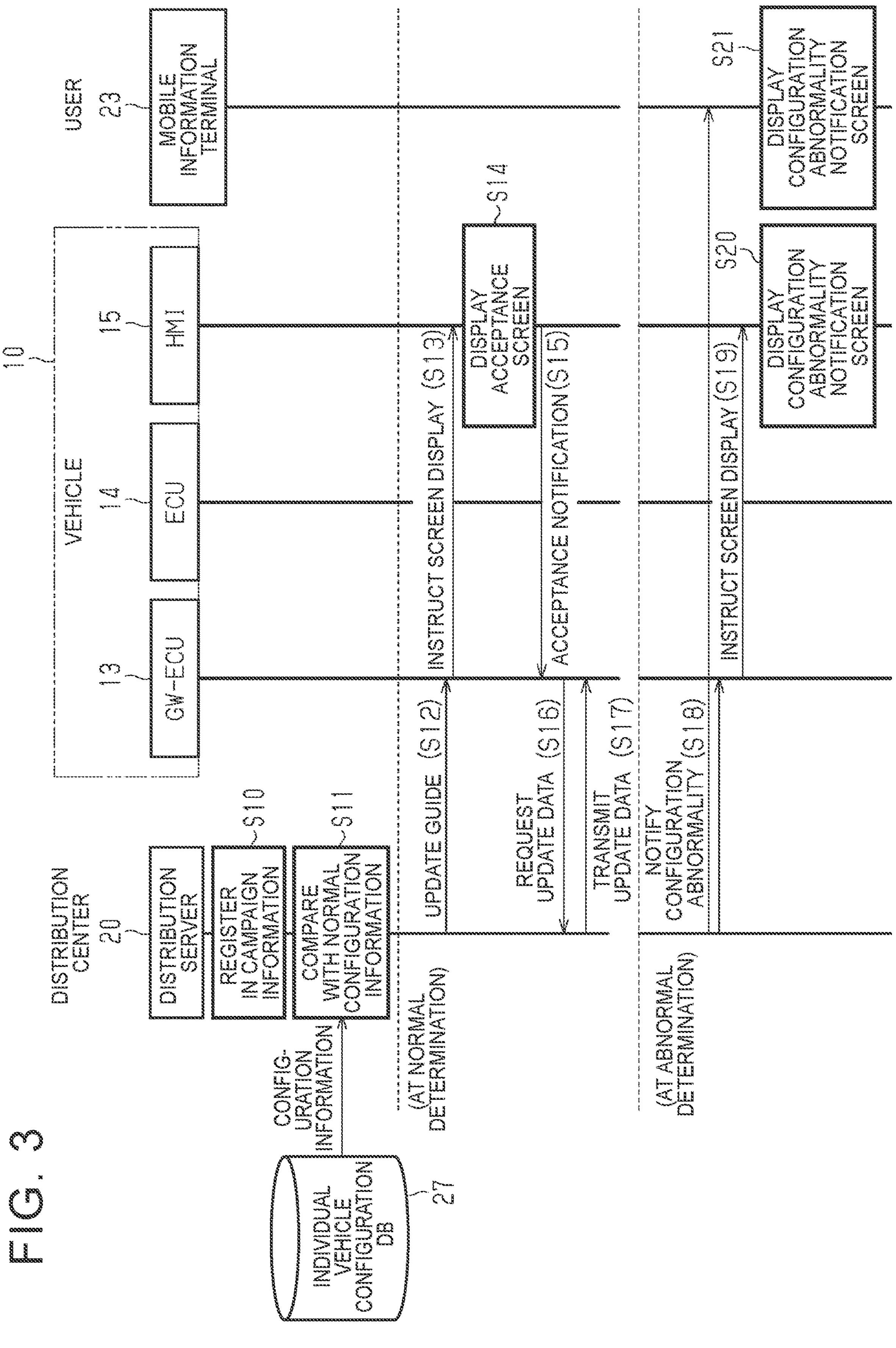
FIG. 3 is a sequence diagram showing a flow of a distribution process of update data in the distribution system.
Figure 4:
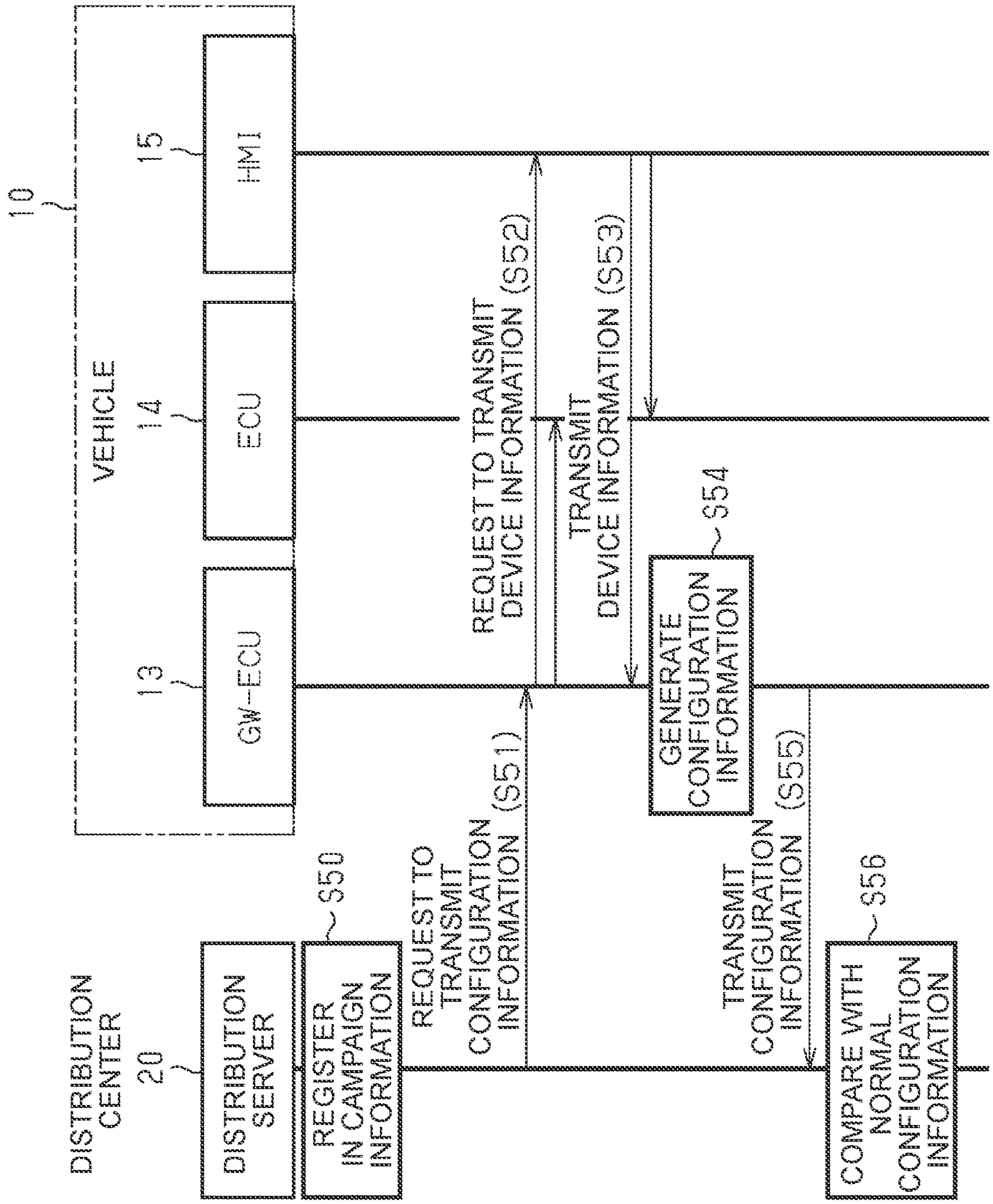
FIG. 4 is a sequence diagram showing a flow of an acquisition process of configuration information in a distribution system according to a second embodiment.

FIG. 4 shows a process procedure of the distribution system 1 of the present embodiment when acquiring the configuration information. When the campaign information on the software update is registered in the campaign database 28 (S50), the distribution server 20 requests each vehicle 10 that is subject to the software update to transmit the configuration information (S51). When the gateway ECU 13 of each vehicle 10 receives this request, the gateway ECU 13 requests each in-vehicle device to transmit the device information (S52). When each in-vehicle device transmits the device information (S53), the gateway ECU 13 generates the configuration information on the in-vehicle network 11 (S54). Then, the gateway ECU 13 transmits the generated configuration information to the distribution server 20 (S55). When the distribution server 20 receives the configuration information, the distribution server 20 performs the configuration abnormality determination by comparing with the normal configuration information in the campaign information (S56). The process procedure after the configuration abnormality determination is the same as in the case of FIG. 3.

Also in the present embodiment, the distribution server 20 acquires the configuration information on the in-vehicle network 11 from each vehicle 10 and performs the configuration abnormality determination. Then, the distribution server 20 performs the configuration abnormality notification to the user of the vehicle 10 in which the configuration is determined not to be normal. Therefore, the present embodiment also has an effect of making the user of the vehicle 10 easier to understand that the software update of the in-vehicle device cannot be performed due to the configuration abnormality of the in-vehicle network 11. Furthermore, also in the case of the present embodiment, the effects (1), (3) to (6) described above can be obtained.

Other Embodiments

The above embodiment can be implemented with the following modifications. The above embodiment and the following modifications can be combined with each other within a technically consistent range to be implemented.

The normal configuration information may be stored in the storage unit 25 of the distribution server 20 separately from the campaign information of the software update.

The vehicle 10 may transmit the configuration information to the distribution server 20 at a time different from that in the above embodiment.

When the configuration information that is acquired from the vehicle 10 is not stored in the distribution server 20, the individual vehicle configuration database 27 may be omitted.

The in-vehicle network 11 may be configured so that another in-vehicle device performs the process of the gateway ECU 13 in FIGS. 2 to 4.

The update data may also be transmitted to the vehicle 10 in which the configuration of the in-vehicle network 11 is determined to be abnormal. In the vehicle 10 in this case, the update data is stored, and when the configuration of the in-vehicle network 11 is later determined to be normal, the software update is performed by using the stored update data.

The configuration information does not need to include the version information on the software of the in-vehicle device.

The distribution server 20 may perform the configuration abnormality notification to only one of the vehicle 10 and the mobile information terminal 23.

APPENDIXES

Appendix 1

A distribution system includes a vehicle that includes an in-vehicle network that is configured by in-vehicle devices, and a distribution server that distributes software update data for the in-vehicle devices to the vehicle, wherein: updating the software with the update data is performed on a condition that a configuration of the in-vehicle network is normal; the distribution server includes a processor and a storage unit that stores normal configuration information that indicates a normal configuration of the in-vehicle network; the vehicle is configured to transmit configuration information on the in-vehicle network to the distribution server; and the processor is configured to: determine whether the configuration of the in-vehicle network is normal, based on the configuration information and the normal configuration information; and notify, when the configuration of the in-vehicle network is determined not to be normal, a user of the vehicle that the configuration of the in-vehicle network is not normal.

Appendix 2

The distribution system according to Appendix 1, wherein the vehicle transmits the configuration information to the distribution server when there is a change in the configuration of the in-vehicle network.

Appendix 3

The distribution system according to Appendix 1 or Appendix 2, wherein the configuration information includes the version information on the software of the in-vehicle devices.

Appendix 4

The distribution system according to any one of Appendix 1 to Appendix 3, wherein the distribution server prohibits the distribution of the update data to the vehicle in which the configuration of the in-vehicle network is determined not to be normal.

Appendix 5

The distribution system according to any one of Appendix 1 to Appendix 4, wherein the distribution server notifies the mobile information terminal of the user that the configuration of the in-vehicle network is not normal.

Appendix 6

A distribution server that distributes software update data for in-vehicle devices in a vehicle that includes an in-vehicle network that is configured by the in-vehicle devices to the vehicle, wherein: the distribution server includes a processor and a storage unit that stores normal configuration information that indicates a normal configuration of the in-vehicle network; updating the software with the update data is performed on a condition that a configuration of the in-vehicle network is normal; and the processor is configured to: determine whether the configuration of the in-vehicle network is normal, based on the configuration information on the in-vehicle network that is acquired from the vehicle and the normal configuration information; and notify, when the configuration of the in-vehicle network is determined not to be normal, a user of the vehicle that the configuration of the in-vehicle network is not normal.

Appendix 7

The distribution server according to Appendix 6, wherein the configuration information includes the version information on the software of the in-vehicle devices.

Appendix 8

The distribution server according to Appendix 6 or Appendix 7, wherein the distribution server prohibits the distribution of the update data to the vehicle in which the configuration of the in-vehicle network is determined not to be normal.

Appendix 9

The distribution server according to any one of Appendix 6 to Appendix 8, wherein the distribution server notifies the mobile information terminal of the user that the configuration of the in-vehicle network is not normal.

What is claimed is:

1. A distribution system comprising:

a plurality of vehicles, wherein each vehicle of the plurality of vehicles includes an in-vehicle network configured by in-vehicle devices; and a distribution server configured to distribute update data of software of the in-vehicle devices to the plurality of vehicles, wherein:

the distribution server includes a processor and a storage unit that stores a campaign database and configuration information of the in-vehicle network received from each vehicle of the plurality of vehicles;

the processor is configured to register campaign information in the campaign database, wherein the campaign information includes the update data of the software of the in-vehicle devices and normal configuration information that indicates a normal configuration of the in-vehicle network;

each vehicle of the plurality of vehicles is configured to transmit the configuration information of the in-vehicle network of a respective vehicle to the distribution server; and the processor is further configured to:

upon registration of the campaign information in the campaign database, for each vehicle of the plurality of vehicles, determine whether a configuration of the in-vehicle network of the respective vehicle is normal, based on the configuration information of the respective vehicle stored in the storage unit and the normal configuration information of the in-vehicle network included in the campaign information;

transmit a software update guide based on the campaign information to each vehicle of the plurality of vehicles whose configuration of the in-vehicle network is determined to be normal;

perform the determination of whether the configuration of the in-vehicle network of the respective vehicle is normal in response to the registration of the campaign information in the campaign database, using the configuration information of the respective vehicle that is stored in the storage unit at a time of the registration of the campaign information in the campaign database, and before the update data of the software of the in-vehicle devices is distributed to the respective vehicle;

prohibit distribution of the update data of the software of the in-vehicle devices to each vehicle of the plurality of vehicles whose configuration of the in-vehicle network is determined not to be normal; and notify, when the configuration of the in-vehicle network of the respective vehicle is determined not to be normal, a user of the respective vehicle that the configuration of the in-vehicle network is not normal by transmitting a configuration abnormality notification to that vehicle and to a mobile information terminal of the user.

2. The distribution system according to claim 1, wherein the respective vehicle is configured to transmit the configuration information of the respective vehicle to the distribution server, when there is a change in the configuration of the in-vehicle network of the respective vehicle.

3. A distribution server configured to distribute update data of software of in-vehicle devices to a plurality of vehicles, each vehicle of the plurality of vehicles including an in-vehicle network configured by the in-vehicle devices, the distribution server comprising:

a processor; and a storage unit that stores a campaign database and configuration information of the in-vehicle network received from each vehicle of the plurality of vehicles, wherein:

the processor is configured to register campaign information in the campaign database, wherein the campaign information includes the update data of the software of the in-vehicle devices and normal configuration information that indicates a normal configuration of the in-vehicle network;

each vehicle of the plurality of vehicles is configured to transmit the configuration information of the in-vehicle network of a respective vehicle to the distribution server; and the processor is further configured to:

upon registration of the campaign information in the campaign database, for each vehicle of the plurality of vehicles, determine whether a configuration of the in-vehicle network of the respective vehicle is normal, based on the configuration information of the respective vehicle stored in the storage unit and the normal configuration information of the in-vehicle network included in the campaign information;

transmit a software update guide based on the campaign information to each vehicle of the plurality of vehicles whose configuration of the in-vehicle network is determined to be normal;

perform the determination of whether the configuration of the in-vehicle network of the respective vehicle is normal in response to the registration of the campaign information in the campaign database, using the configuration information of the respective vehicle that is stored in the storage unit at a time of the registration of the campaign information in the campaign database, and before the update data of the software of the in-vehicle devices is distributed to the respective vehicle;

prohibit distribution of the update data of the software of the in-vehicle devices to each vehicle of the plurality of vehicles whose configuration of the in-vehicle network is determined not to be normal; and notify, when the configuration of the in-vehicle network of the respective vehicle is determined not to be normal, a user of the respective vehicle that the configuration of the in-vehicle network is not normal by transmitting a configuration abnormality notification to that vehicle and to a mobile information terminal of the user.

4. The distribution server according to claim 3, wherein the configuration information of the respective vehicle includes version information on the software of the in-vehicle devices.

5. A non-transitory recording medium storing instructions that are executable by one or more processors of a distribution server that distribute update data of software of in-vehicle devices to a plurality of vehicles, wherein each vehicle of the plurality of vehicles includes an in-vehicle network configured by the in-vehicle devices, and that cause the one or more processors of the distribution server to perform functions, and wherein:

the distribution server includes a processor and a storage unit that stores a campaign database and configuration information of the in-vehicle network received from each vehicle of the plurality of vehicles;

the functions include registering campaign information in the campaign database, wherein the campaign information includes the update data of the software of the in-vehicle devices and normal configuration information that indicates a normal configuration of the in-vehicle network;

each vehicle of the plurality of vehicles is configured to transmit the configuration information of the in-vehicle network of a respective vehicle to the distribution server; and the functions further include:

upon registration of the campaign information in the campaign database, for each vehicle of the plurality of vehicles, determining whether a configuration of the in-vehicle network of the respective vehicle is normal, based on the configuration information of the respective vehicle stored in the storage unit and the normal configuration information of the in-vehicle network included in the campaign information;

transmitting a software update guide based on the campaign information to each vehicle of the plurality of vehicles whose configuration of the in-vehicle network is determined to be normal;

performing the determination of whether the configuration of the in-vehicle network of the respective vehicle is normal in response to the registration of the campaign information in the campaign database, using the configuration information of the respective vehicle that is stored in the storage unit at a time of the registration of the campaign information in the campaign database, and before the update data of the software of the in-vehicle devices is distributed to the respective vehicle;

prohibiting distribution of the update data of the software of the in-vehicle devices to each vehicle of the plurality of vehicles whose configuration of the in-vehicle network is determined not to be normal; and notifying, when the configuration of the in-vehicle network of the respective vehicle is determined not to be normal, a user of the respective vehicle that the configuration of the in-vehicle network is not normal by transmitting a configuration abnormality notification to that vehicle and to a mobile information terminal of the user.

* * * * *